United States Patent [19]

Orcutt

[11] 3,961,749

[45] June 8, 1976

[54] MULTIPLE PORT MULTIPLE TEMPERATURE THERMALLY RESPONSIVE VALVE

[75] Inventor: John W. Orcutt, Norton, Mass.

[73] Assignee: Texas Instruments Incorporated, Dallas, Tex.

[22] Filed: Jan. 10, 1975

[21] Appl. No.: 535,922

[52] U.S. Cl. ............... 236/101 D; 123/117 A; 123/119 A; 137/625.46; 236/87
[51] Int. Cl.² ............................................. G05D 23/08
[58] Field of Search .......... 236/87, 101; 123/117 A, 123/119 A; 137/625.46, 625.21

[56] References Cited
UNITED STATES PATENTS

| | | | |
|---|---|---|---|
| 2,739,614 | 3/1956 | Kreske | 236/87 X |
| 3,747,630 | 7/1973 | Hurrell | 137/625.46 X |
| 3,796,232 | 3/1974 | Dalton | 137/625.46 X |
| 3,837,360 | 9/1974 | Bubula | 137/625.46 |

Primary Examiner—William E. Wayner
Assistant Examiner—William E. Tapolcai, Jr.
Attorney, Agent, or Firm—John A. Haug; James P. McAndrews; Russell E. Baumann

[57] ABSTRACT

A thermally responsive valve assembly comprises a plurality of fluid ports in which typically two are connected to vacuum sources, one to vent and another two to control functions. The switching of the control functions from vacuum to vent and back again is controlled by a bimetallic coil which rotates and, in turn, causes a switch disc to rotate thereby changing the passage route between the ports from vacuum to vent or visa versa.

10 Claims, 13 Drawing Figures

MULTIPLE PORT MULTIPLE TEMPERATURE THERMALLY RESPONSIVE VALVE

BACKGROUND AND SUMMARY OF INVENTION

This invention relates to a thermally responsive valve assembly and more particularly to such a multi-port valve assembly which is specifically adapted to be positioned in heat-transfer relation with an object (e.g. an automobile engine block) to switch the multiport valve system upon increase or decrease in temperature.

The multiple port, multiple temperature valve assembly of this invention is particularly adapted for use in automotive emission control systems to vent or block a vacuum system upon the engine reaching various desired operating temperatures. Multiple port wax actuated valves are currently used for automotive emission control systems. These valves consist of valve means actuated by a volume change of wax upon reaching a predetermined temperature. These valves, however, are only actuatable at one temperature and eventually are subject to loss of wax and consequently a shift of operating temperature due to the high pressure buildup.

It is an object of this invention to provide a thermally responsive valve assembly that is actuatable at more than one temperature. It is yet another object of this invention to provide a thermally responsive valve assembly which is of compact size and to which a plurality of tubes or the like may be readily connected to ports entering the valve assembly. It is still another object of this invention to provide a multi-port, multi-temperature thermally responsive valve which is economical to manufacture, easy to install and reliable in operation. Other objects and features of this invention will be in part apparent and in part pointed out hereinafter.

Briefly, a multi-port, multi-temperature thermally responsive valve assembly of this invention comprises a two part valve body, the first part having five ports leading into a manifold portion with five separate chamber paths provided therein. The ports and manifold fit into the thermally conductive second body part and are secured therein. Within the second body part is a bimetallic coil which has its outside tang fixed in a bail and its inside end secured in an arbor which is free to rotate as the inside end of the coil rotates in response to temperature change. The rotation of the arbor causes a switch disc which is in sealing contact with the manifold and having prepositioned passages to also rotate causing the new position of these paths to switch control functions from vacuum to vent and back again at the desired temperature. The valve body includes a thermally conductive portion adapted for heat exchange with an object, such as an automobile engine, for transferring heat to or from the coil to increase or decrease the temperature of the coil in response to a corresponding increase or decrease in the temperature of the object.

Brief Description of the Drawings

Corresponding reference characters indicate corresponding parts throughout the several views of the drawings.

Figure 1:
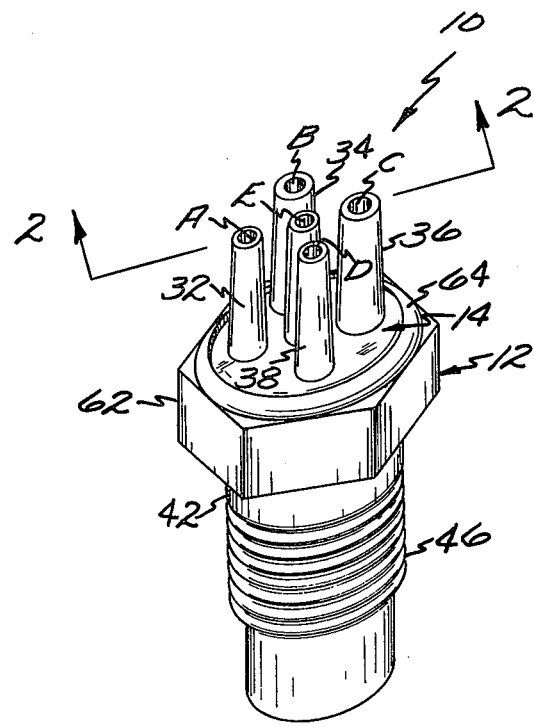
FIG. 1 is a perspective view of the valve assembly of this invention.
Figure 4:
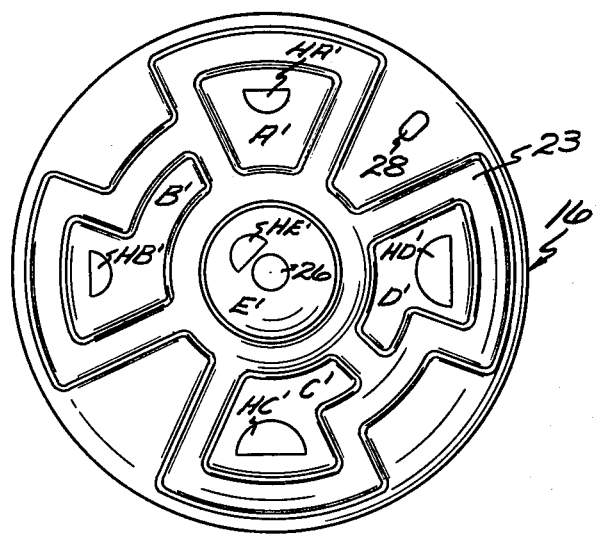
FIG. 4 is an enlarged bottom plan view of the port plate included in the assembly shown in FIG. 2.
Figure 5:
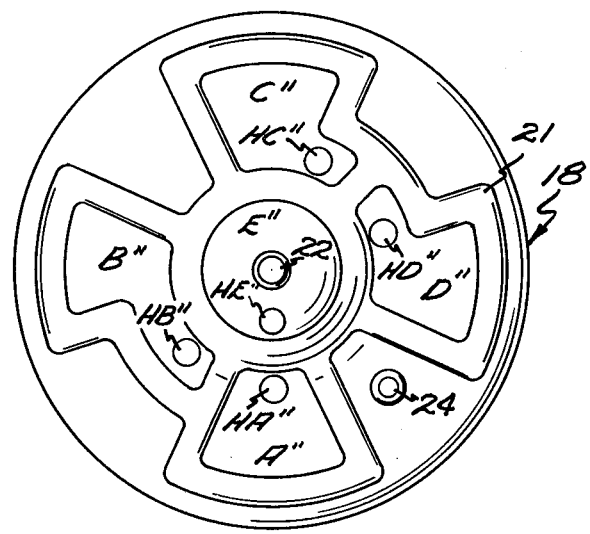
FIG. 5 is an enlarged top plan view of the switch plate included in the assembly shown in FIG. 2.
Figure 7:
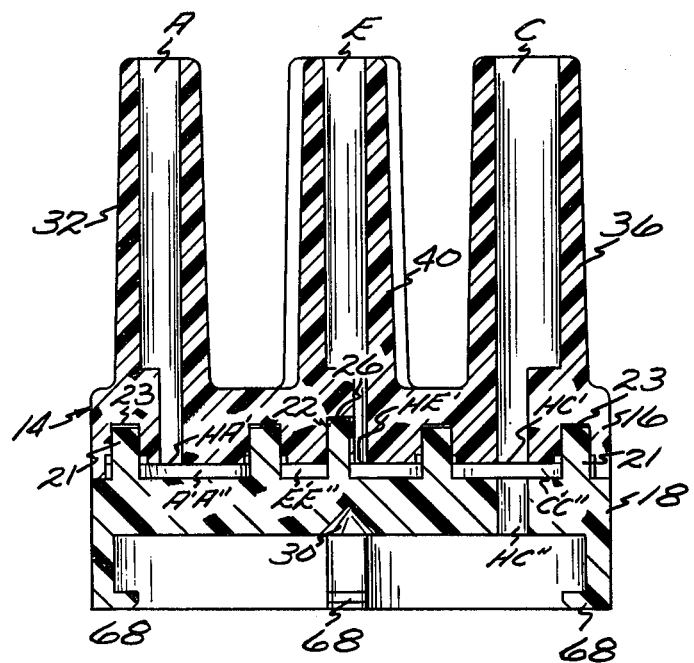
FIG. 7 is a cross-sectional view of a first body part bisecting passages A, E, and C of FIG. 1.
Figure 11:
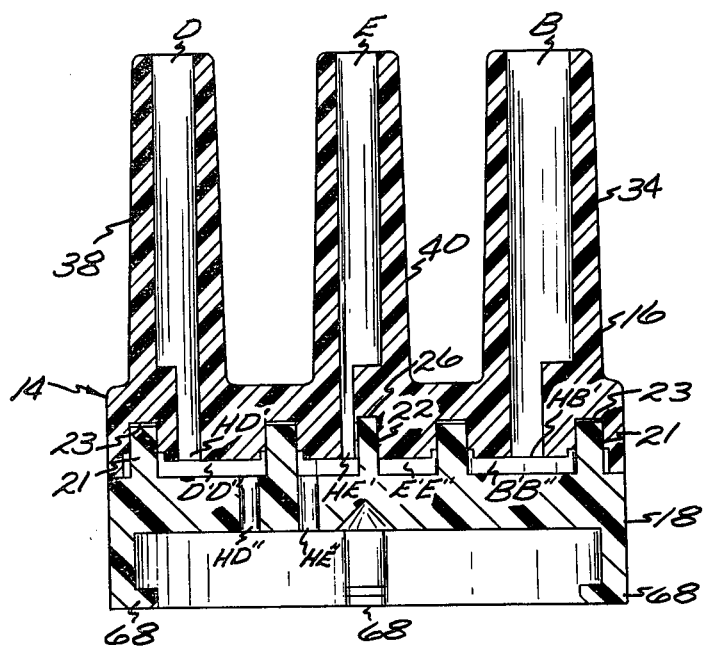
FIG. 11 is a cross-sectional view of the first body part bisecting passages B, E and D of FIG. 1.

Referring now to the drawings, a thermally responsive valve assembly of this invention is indicated in its entirety at 10 and is shown to include a two-part valve body 12. The first part 14 of the valve body, as seen best in FIGS. 7 and 11, is made up of a port plate 16 and a switch plate 18 both composed of the same material such as a plastic, which are sealed together as by ultrasonic welding to provide a manifold portion 20 of valve 10. Manifold 20 has five passage portions that are formed by interlocking the bottom surface of port plate 16 as shown in FIG. 4 and the top surface of switch plate 18 as shown in FIG. 5. For example, outer wall 21 of switch plate 18 is received by a complimentary recess 23 in port plate 16. Section A' of FIG. 4 and A'' of FIG. 5 interlock to form the first passage portion A'A'' and the same for B' and B'', C' and C'', D' and D'' and E' and E'' as shown in FIGS. 7 and 11. Passage portions A' A'', B'B'', C'C'', D'D'' and E'E'' are part of five main passages A, B, C, D & E within valve 10 as seen in FIG. 1. To ensure proper alignment during joining of the two plates, a center pin 22 and a second pin 24 near the periphery of the top of switch plate 18 are slidably received by corresponding central cavity 26 and second periphery cavity 28 in the port plate bottom. Opposite center pin 22 in the bottom surface of switch plate 18 is a cone-shaped cavity 30 to be discussed further below.

To allow for flow into or out of manifold 20 each passage portion A'A'', B'B'', C'C'', D'D'' and E'E'' has two holes one HA', HB', HC', HD', or HE' through port plate 16 and the other HA'', HB'', HC'', HD'' or HE'' through switch plate 18. Holes HA', HB', HC', HD' and HE' in port plate 16 each connect with an upper portion of main passages A, B, C, D and E. The upper portion of passages A–E are enclosed by five nipples 32, 34, 36, 38 and 40 as best shown by FIGS. 1, 7 and 11 which preferably extend externally from port plate 16 generally in a direction parallel to the axis of valve body 12. The nipples are positioned such that fluid lines (not shown) fit over them as one end of passages A, B, C, D and E to connect valve assembly 10 with vacuum and vent sources and control functions. As shown in FIG. 1 all of the nipples need not be the same size so as to be able to receive different size lines.

The second part of two-part valve body 12 is generally indicated at 42 and is shown to comprise a cup-shaped member adapted to be sealingly secured to first body part 14. More particularly, second body part 42 comprises a member of a thermally conductive material, such as brass, having a threaded stud 46 and a deep recess 44 therein for reception of a spring bail member 48, a bimetallic coil 50, a split arbor 52, a spring 54, a switch disc 56 and a backing plate 58 and first body part 14. Recess 44 has a stepped shoulder 60 therein formed near the open end of body part 42 against which the bottom portion of valve body part 14 as shown in FIG. 7 bears when the two body parts are assembled. Body part 42 has a hexagonal-shaped portion 62 enabling valve assembly 10 to be readily inserted in a threaded hole and also has a relatively thin wall 64 extending upwardly from hexagonal shaped portion 62. Thin wall 64 is adapted to be rolled over to sealingly secure the two valve parts together to form valve body 12.

Figure 2:
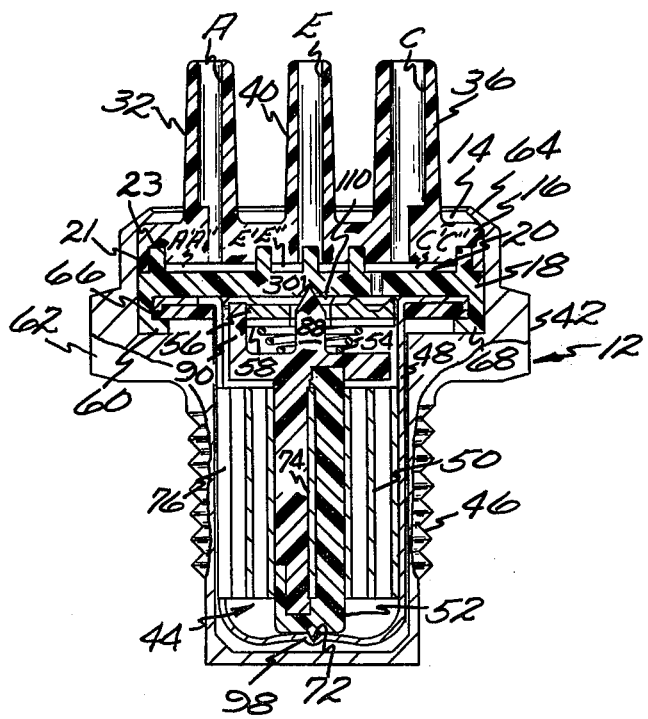
FIG. 2 is a partial cross-sectional view of the valve assembly of FIG. 1 taken along line 2—2.
Figure 8:
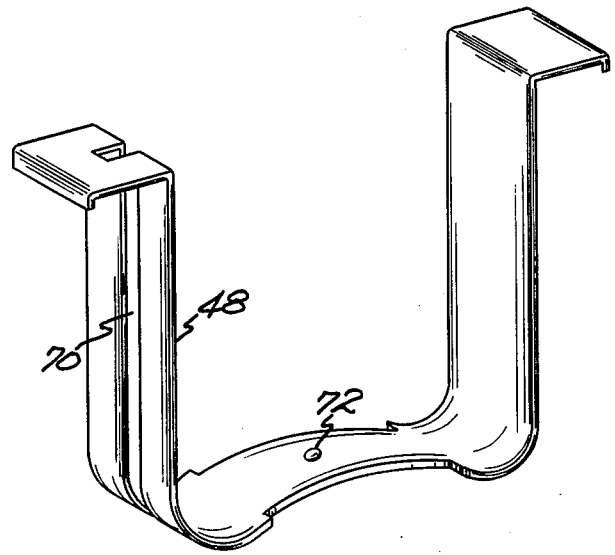
FIG. 8 is an enlarged perspective view of a bail member shown in the FIG. 2 assembly.

Press fitted into the bottom portion of valve part 14 is a bail retainer 66 which is held in place by tab members 68 as best shown in FIGS. 2, 7 and 11. Bail retainer 66 may be made from plastic similar to first body 14 and molded with a notched out portion (not shown) over which bail member 48 as best shown in FIG. 8 fits. Bail member 48 is generally U-shaped with one leg of the U having a long notch 70 in it. Also in the bottom of the U is a small recess 72 which serves as a pivot point for rotation of arbor 52 which will be explained more fully below. Bail member 48 may be conveniently made from a spring steel material.

Figure 3:
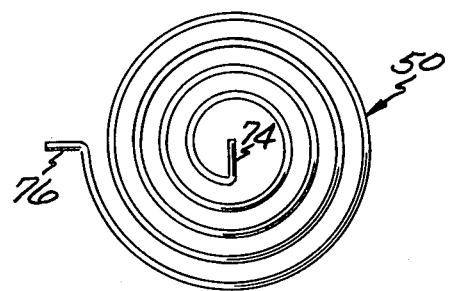
FIG. 3 is an enlarged top plan view of the bimetal coil included in the assembly shown in FIG. 2.

Bimetal coil 50, best shown in FIG. 3, has an inside diameter tang 74 and an outside diameter tang 76. Outside diameter tang 76 is secured in long notch 70 of bail member 48 which fixes the position of the outside diameter of the coil. The inside tang 74 is secured in movable split arbor 52. Therefore, when bimetal coil 50 is subjected to an increase or decrease in temperature, the coil will cause arbor 52 to rotate. Coil 50 is positioned adjacent heat conductive second body part 42 so as to respond quickly to change in temperature of this body part.

Figure 9:
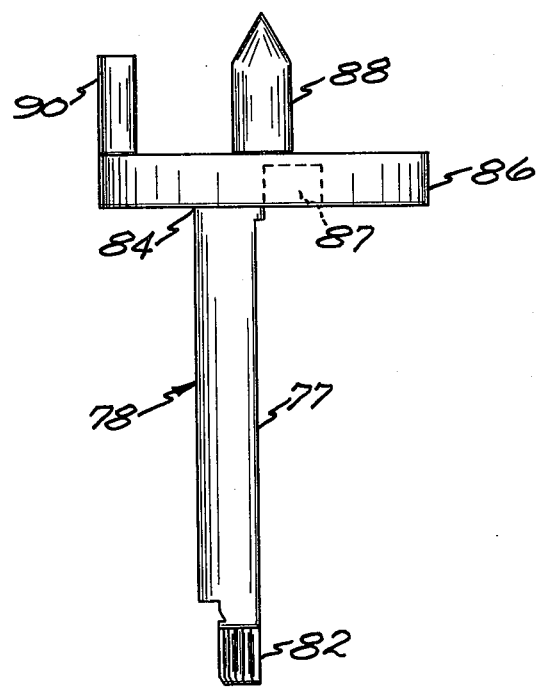
FIG. 9 is a front plan view of a first part of a split arbor used in the assembly shown in FIG. 2.
Figure 10:
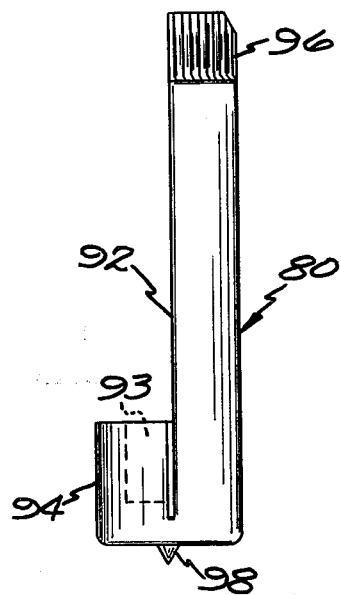
FIG. 10 is a front plan view of a second part of the split arbor used in the assembly shown in FIG. 2.

Split arbor 52 is made up of a first part 78, best shown in FIG. 9, and a second part 80, best shown in FIG. 10. First part 78 has a half cylindrical shaft portion 77 with a firse end 82 of reduced size and a second end 84 which abuts a disc shaped piece 86 with a half cylindrical cavity 87 therein on one side adjacent second end 84. On the other or top side of disc piece 86 are a central projection 88 and an outside projection 90 of somewhat less heighth. Second arbor part 80 has a half cylindrical shaft 92 which is complementary to shaft 77 of first part 78. A first end 94 of shaft 92 is cylindrical with a hollow portion 93 therein for receiving end portion 82 of first part 78 and a second end 96 of reduced diameter fits into half cylindrical cavity 87 in disc piece 86. In the bottom surface of second arbor part 80 is a small projection 98 which fits into recess 72 in bail item 48 to provide a point about which arbor 52 can rotate. When the two parts 78, 80 of arbor 52 are assembled a small slit remains between the two shaft portions 77, 92 in which the inside diameter tang 74 of bimetal coil 50 is secured. It will be understood that arbor 52 may also be made from a single piece if so desired.

Figure 6:
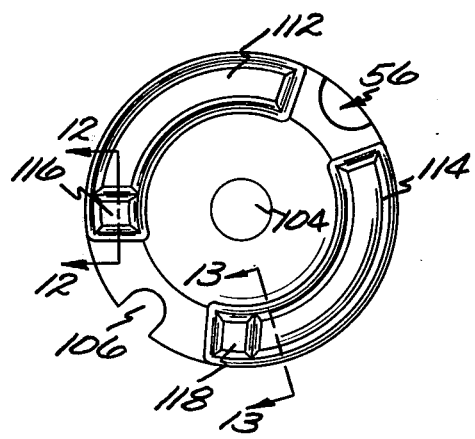
FIG. 6 is an enlarged top plane view of the switch disc included in the assembly shown in FIG. 2.

In accordance with this invention, switch disc 56 as shown in FIG. 6, which may be conveniently made from rubber, is adhered to backing plate 58 of rigid material such as steel. The backing plate 58 and switch disc 56 have a central hole 104 and an outside hole 106 therethrough of specific sizes so as to fit onto projections 88, 90 on disc piece 86. Coil spring 54 is placed between the top side of disc piece 86 and the bottom surface of backing plate 58 as shown in FIG. 2. Coil spring 54 presses switch disc 56 up against the bottom of switch plate 18 to sealingly engage disc 56 and plate 18 together to form rotary valve member 110. Center projection 88 assures proper alignment by fitting into cone-shaped cavity 30 in the bottom surface of switch plate 18.

Figure 12:
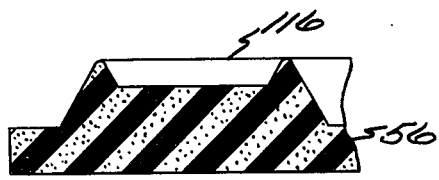
FIG. 12 is a cross-sectional view of a set of twin protrudences of FIG. 6 taken along line 12—12.
Figure 13:
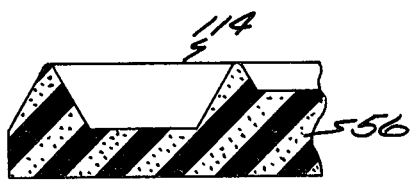
FIG. 13 is a cross-sectional view of a linking passage portion of FIG. 6 taken along line 13—13.

The top surface of switch disc 56 has two passage portions 112, 114 as shown in FIGS. 6 and 13 each with a set of twin protrudences 116, 118 as shown in FIGS. 6 and 12 therein to prevent cross-venting from taking place when switching from a vacuum to a vent source as described in co-assigned and co-pending application Ser. No. 501,711 filed Aug. 29, 1974, which is a continuation-in-part of abandoned application Ser. No. 422,954 filed Dec. 7, 1973.

Passage portions 112, 114 provide a linking passage for communication among flow passages A, B, C, D and E within valve assembly 10.

The purpose of rotary valve member 110 is to provide selected communication among the flow passages A, B, C, D and E. Member 110 is made up of linking passage portions 112, 114 and openings at a second end of passages A, B, C, D and E which are the same as previously mentioned holes HA'', HB'', HC'', HD'' and HE''. Holes HA'', HB'', HC'' and HD'' are all spaced the same distance from the center of rotation of member 110 and adapted to be in alignment with passage portions 112, 114 while hole HE'' is spaced closer to the center of rotation of member 110 and adapted to be in alignment with a third linking passage portion intermediate passage portions 112, 114. As portions 112, 114 are rotated, they are positioned to be able to completely contain holes HA'', HB'', HC'' and HD''. Hole HE is disposed to be in communication with any of holes HA'', HB'', HC'' or HD'' not contained within either portions 112 or 114 or in other words is positioned within a third linking passage portion occypying that part of disc 56 outside of portions 112 or 114. For example, in a typical situation, HA'' and HB'' are positioned within portion 112 and HC'' is positioned within portion 114 with HD'' outside of either portion 112 or 114 so that passage A is in communication with passage B and passage D is in communication with passage E. However, as the temperature changes and disc 56 rotates, at a first temperature hole HD'' will become contained within passage portion 114 so passage C will be in communication with passage D and at a second temperature hole HA'' will no longer be contained within passage 112 so that passage A will be in communication with passage E. Typically in automotive applications two passages will be connected to control functions, two will be connected to vacuum sources and the last to vent. Thus, valve assembly 10 provides for switching two different control functions associated with two different vacuum sources from the respective vacuum source to a vent source at different temperatures. Clearly more passages could be easily used than the five shown above.

In view of the above, it will be seen that the several objects of the invention are achieved and other advantageous results attained.

As various changes could be made in the above constructions without departing from the scope of the invention, it is intended that all matter contained in the above description be shown in the accompanying drawings shall be interpreted as illustrative and not in a limiting sense.

I claim:

1. A thermally responsive valve assembly comprising a valve body, said body having a plurality of passages therein and valve means including a thermally responsive bimetallic coil and rotatable passage switching means operably connected thereto, said rotatable passage switching means including a switch disc and a switch plate, said switch plate having a plurality of holes therein, each of said holes being a part of one of said passages, said switch disc having a plurality of linking passage portions and being rotatable to provide communication between the various holes which changes as said disc rotates, said bimetal coil rotating said passage switching means in response to temperature changes to effect a change in communication between said passages.

2. A thermally responsive valve assembly comprising a valve body, said body having a plurality of passages therein and valve means including a thermally responsive bimetallic coil, a bail member and a rotatable split arbor, and rotatable passage switching means operably connected to said coil, said rotatable passage switching means includes a switch disc and a switch plate, said switch plate having a plurality of holes therein, each of said holes being a part of one of said passages, said switch disc having a plurality of linking passage portions and being rotatable to provide communication between the various holes which changes as said disc rotates, said bimetal coil rotating said passage switching means in response to temperature changes to effect a change in communication between said passages, said bail member having a notched out portion for fixedly anchoring one end of said bimetal coil while an opposite end is free to rotate when subjected to temperature changes, said split arbor receiving said opposite end to rotate in conjunction with said opposite end thereby causing said switch disc affixed to said arbor to rotate.

3. A thermally responsive valve assembly as set forth in claim 2 wherein the number of passages is five.

4. A thermally responsive valve assembly comprising a valve body having a first part at one end of said valve body and a second part at another end of said body, the first part of the body having a plurality of passages, each passage having an opening at one end adapted for connection to a fluid line and an opening at a second end to allow for communication between passages; and the second part containing a thermally conductive portion and a valve means for providing communication between said passages, said valve means comprising a thermally responsive bimetal coil having a first end and a second end, a bail member for fixedly securing said first end of said bimetal coil, a rotatably split arbor for receiving said second end of said bimetal coil and rotating in conjunction with said coil in response to a temperature increase and decrease, and a switch disc in engagement with said arbor to rotate with said arbor having a plurality of linking passage portions which contain said second end openings to provide communication between passages which is changeable upon rotation of said disc.

5. A thermally responsive valve assembly as set forth in claim 4 in which said switch disc further includes at least one set of two protrudences spaced from one another so that one protrudence rests on each side of the second opening of said passage when switching to prevent cross-venting from occurring.

6. A thermally responsive valve assembly as set forth in claim 5 wherein said thermally conductive portion is made of metallic material having relatively high thermal conductivity, said thermally conductive portion having a threaded portion thereof adapted to be threaded in an opening in an object to insure good heat transfer relation between said object and said bimetallic member.

7. A thermally responsive valve assembly comprising a valve body having a first part at one end of said valve body and a second part at another end of said body, the first part of the body having a plurality of passages, each passage having an opening at one end adapted for connection to a fluid line and an opening at a second end to allow for communication between passages; and the second part containing a thermally conductive portion and a valve means for providing communication between said passages, said valve means comprising a thermally responsive bimetal coil having a first end and a second end, means for fixedly securing said first end of said bimetal coil, and switch disc means rotatably mounted and operatively connected to said second end of said bimetal coil having a plurality of linking passage portions which contain said second end openings to provide communication between passages which is changeable upon rotation of said disc means.

8. A thermally responsive valve assembly as set forth in claim 7 in which the switch disc means includes a rotatable arbor which receives said second end of said bimetal coil and rotates in conjunction with said coil in response to a temperature increase and decrease.

9. A thermally response valve assembly comprising a valve body having a first part at one end of said valve body and a second part at another end of said body, the first part of the body having a plurality of passages, each passage having an opening at one end adapted for connection to a fluid line and an opening at a second end to allow for communication between passages; and the second part containing a thermally conductive portion and a valve means for providing communication between said passages, said valve means comprising a thermally responsive bimetal coil having a first end and a second end, means for fixedly securing said first end of said bimetal coil, and switch disc means rotatably mounted to a rotatable arbor which is split to receive said end of said bimetal coil and rotates in conjunction with said coil having a plurality of linking passage portions which contain said second end openings to provide communication between passages which is changeable upon rotation of said disc means.

10. A thermally responsive valve assembly as set forth in claim 9 wherein the means for fixedly securing said first end is a bail member.

* * * * *